United States Patent [19]

Sallee

[11] Patent Number: 5,368,135
[45] Date of Patent: Nov. 29, 1994

[54] TOW VEHICLE EMERGENCY BRAKE APPARATUS

[76] Inventor: William E. Sallee, P.O. Box 669, Tesuque, N. Mex. 87574

[21] Appl. No.: 65,395

[22] Filed: May 24, 1993

[51] Int. Cl.⁵ .............................................. B60T 7/20
[52] U.S. Cl. ............................ 188/3 R; 188/112 R
[58] Field of Search ............... 188/72.1, 72.7, 72.9, 188/73.1, 3 R, 112 R; 303/7

[56] References Cited

U.S. PATENT DOCUMENTS

| | | | |
|---|---|---|---|
| 3,630,575 | 12/1971 | Fowler | 188/3 R |
| 3,834,767 | 9/1974 | Bullinger | 188/3 R |
| 3,835,966 | 9/1974 | Schwerin | 188/3 R |
| 3,878,922 | 4/1975 | McCarthy | 188/72.9 |
| 3,880,260 | 4/1975 | Schoenhenz | 188/72.9 |
| 4,602,703 | 7/1986 | Prince | 307/7 |

Primary Examiner—Robert J. Oberleitner
Assistant Examiner—Chris Schwartz
Attorney, Agent, or Firm—E. Michael Combs

[57] ABSTRACT

A disc member is arranged for mounting to a differential housing portion of a vehicle in tow, wherein the vehicle in tow further includes a bracket arrangement mounted to the differential housing for supporting a solenoid actuated brake caliper receiving the disc member therewithin, whereupon the solenoid caliper is in electrical communication with the brake light switch of a towing vehicle to effect actuation of the caliper upon actuation of the brake structure of the towing vehicle.

5 Claims, 4 Drawing Sheets

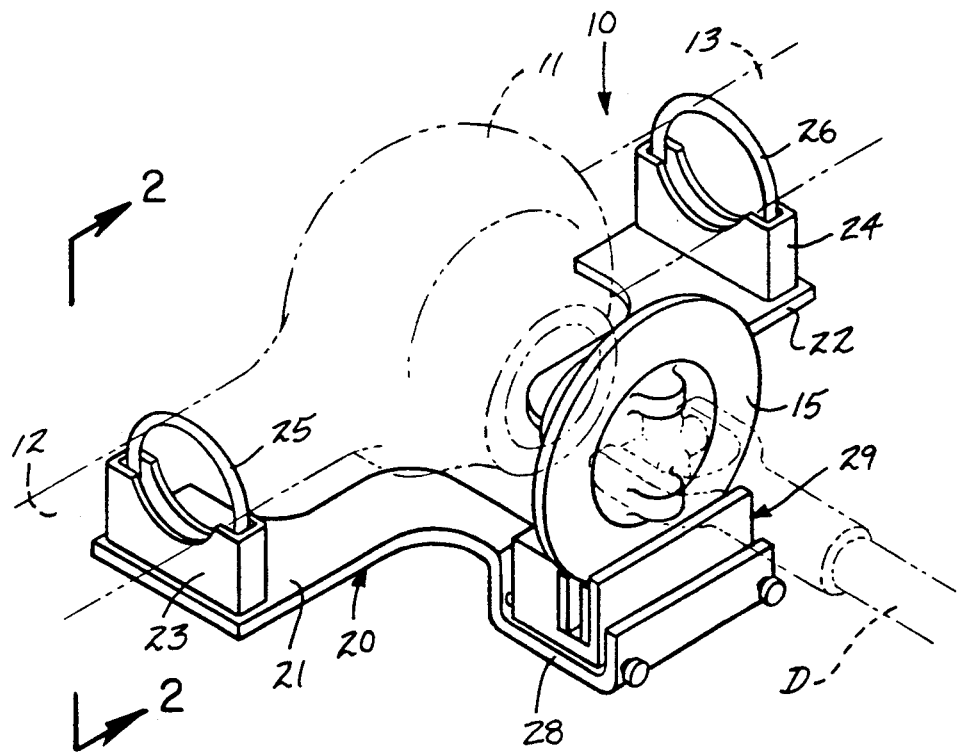
FIG. 1
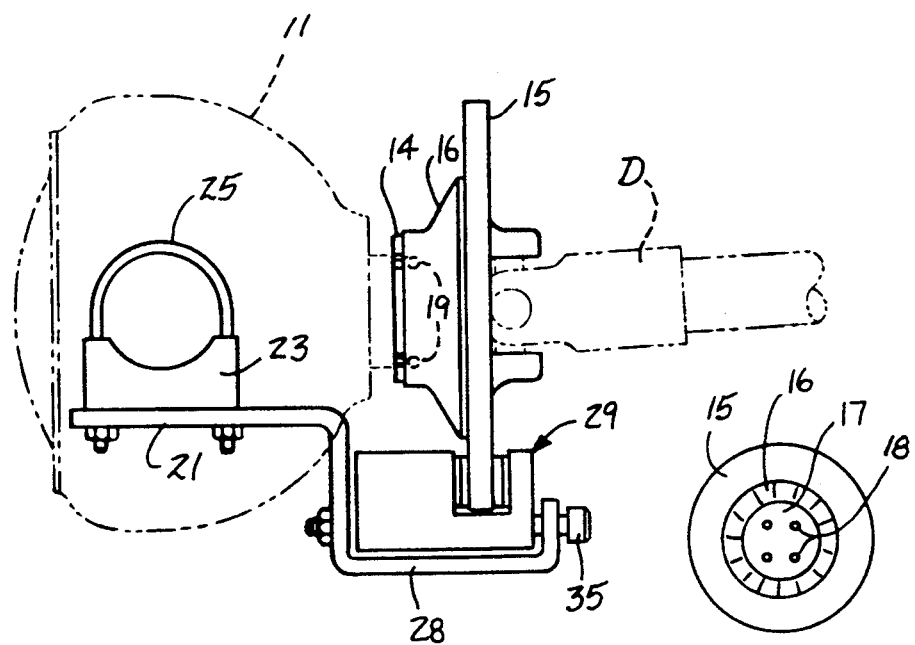
FIG. 2
FIG. 2A

TOW VEHICLE EMERGENCY BRAKE APPARATUS

BACKGROUND OF THE INVENTION

1. Field of the Invention

The field of invention relates to brake apparatus, and more particularly pertains to a new and improved tow vehicle emergency brake apparatus arranged for retrofit relative to a vehicle in tow to permit simultaneous braking of the vehicle in tow in association with a towing vehicle.

2. Description of the Prior Art

Towing vehicle brake structure and electrical brake control organization is indicated in U.S. Pat. No. 3,953,084, as well as various systems for such braking as indicated in U.S. Pat. Nos. 4,084,859; 5,000,519; and 5,002,343.

The instant invention attempts to overcome deficiencies of the prior art by providing for a readily retrofitted braking structure mounted to a vehicle in tow for cooperating with a towing vehicle and in this respect, the present invention substantially fulfills this need.

SUMMARY Of THE INVENTION

In view of the foregoing disadvantages inherent in the known types of towing vehicle brake apparatus now present in the prior art, the present invention provides a tow vehicle emergency brake apparatus arranged for retrofit relative to a vehicle in tow. As such, the general purpose of the present invention, which will be described subsequently in greater detail, is to provide a new and improved tow vehicle emergency brake apparatus which has all the advantages of the prior art towing vehicle brake apparatus and none of the disadvantages.

To attain this, the present invention provides a disc member arranged for mounting to a differential housing portion of a vehicle in tow, wherein the vehicle in tow further includes a bracket arrangement mounted to the differential housing for supporting a solenoid actuated brake caliper receiving the disc member therewithin, whereupon the solenoid caliper is in electrical communication with the brake light switch of a towing vehicle to effect actuation of the caliper upon actuation of the brake structure of the towing vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tow vehicle emergency brake apparatus which has all the advantages of the prior art tow vehicle brake apparatus and none of the disadvantages.

It is another object of the present invention to provide a new and improved tow vehicle emergency brake apparatus which may be easily and efficiently manufactured and marketed.

It is a further object of the present invention to provide a new and improved tow vehicle emergency brake apparatus which is of a durable and reliable construction.

An even further object of the present invention is to provide a new and improved tow vehicle emergency brake apparatus which is susceptible of a low cost of manufacture with regard to both materials and labor, and which accordingly is then susceptible of low prices of sale to the consuming public, thereby making such tow vehicle emergency brake apparatus economically available to the buying public.

Still yet another object of the present invention is to provide a new and improved tow vehicle emergency brake apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an orthographic view, taken along the lines 2—2 of FIG. 1 in the direction indicated by the arrows.

DESCRIPTION OF THE PREFERRED EMBODIMENT

Figure 3:
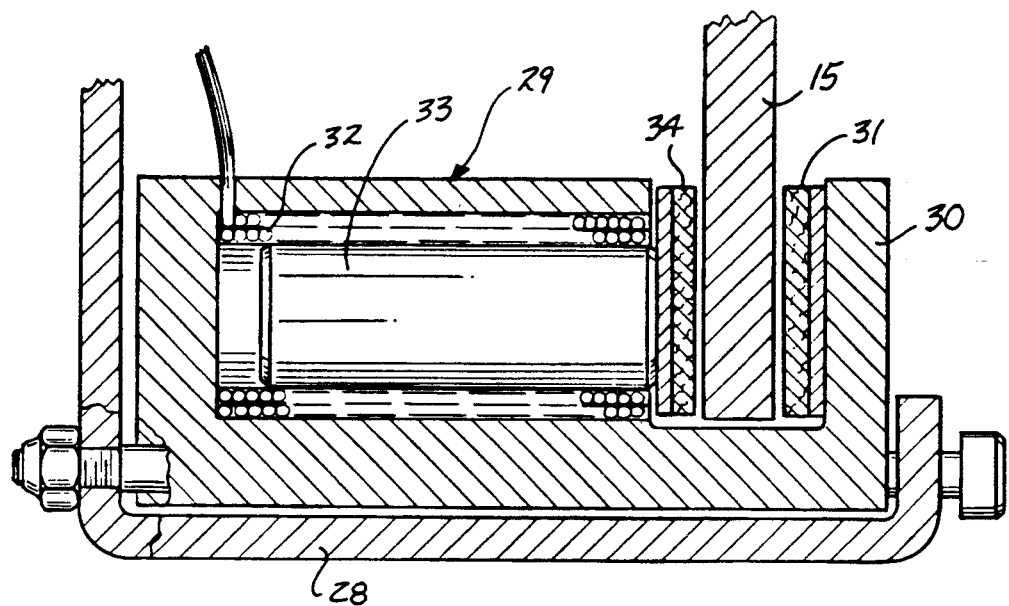
FIG. 3 is an enlarged orthographic cross-sectional illustration of the caliper support bracket and associated electrically actuated caliper of the invention.

With reference now to the drawings, and in particular to FIGS. 1 to 8 thereof, a new and improved tow vehicle emergency brake apparatus embodying the principles and concepts of the present invention and generally designated by the reference numeral 10 will be described.

More specifically, the tow vehicle emergency brake apparatus 10 of the instant invention essentially comprises mounting to a differential housing 11, having a housing first axle tube 12 spaced from and coaxially aligned with a housing second axle tube 13 in a conventional manner. A pinion gear companion flange 14 is mounted to a pinion gear within the differential housing, in a manner well known in the prior art. The apparatus of the invention includes a disc member 15 having a disc hub 16. The disc hub 16 includes a hub floor 17 having a plurality of floor apertures 18 directed therethrough (see FIG. 2a). The disc hub 16 is mounted to the companion flange 14 employing fasteners 19 directed through the floor apertures 18 received within the companion flange 14 to replace the fasteners typically mounting the universal joint of the drive shaft "D" to the companion flange.

Figure 4:
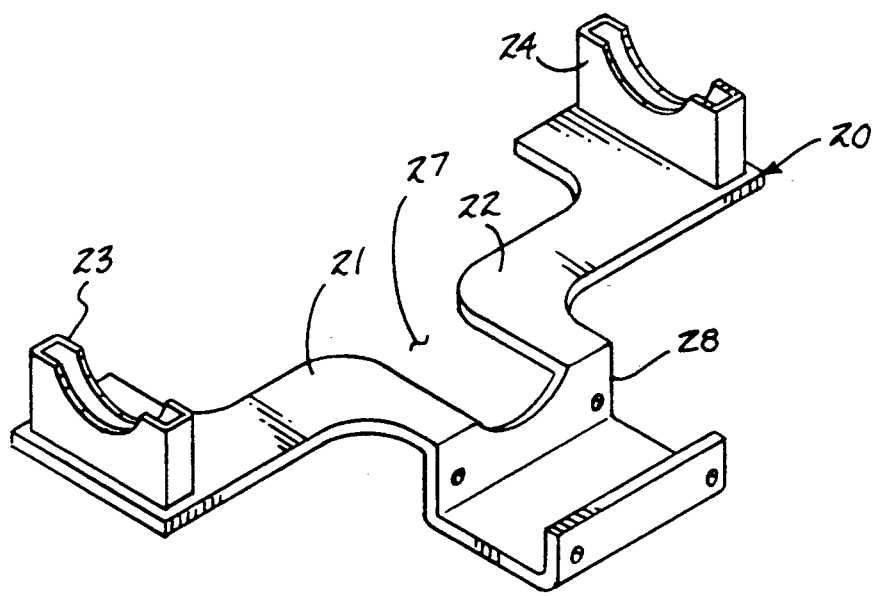
FIG. 4 is an isometric illustration of the upper support bracket structure.
Figure 5:
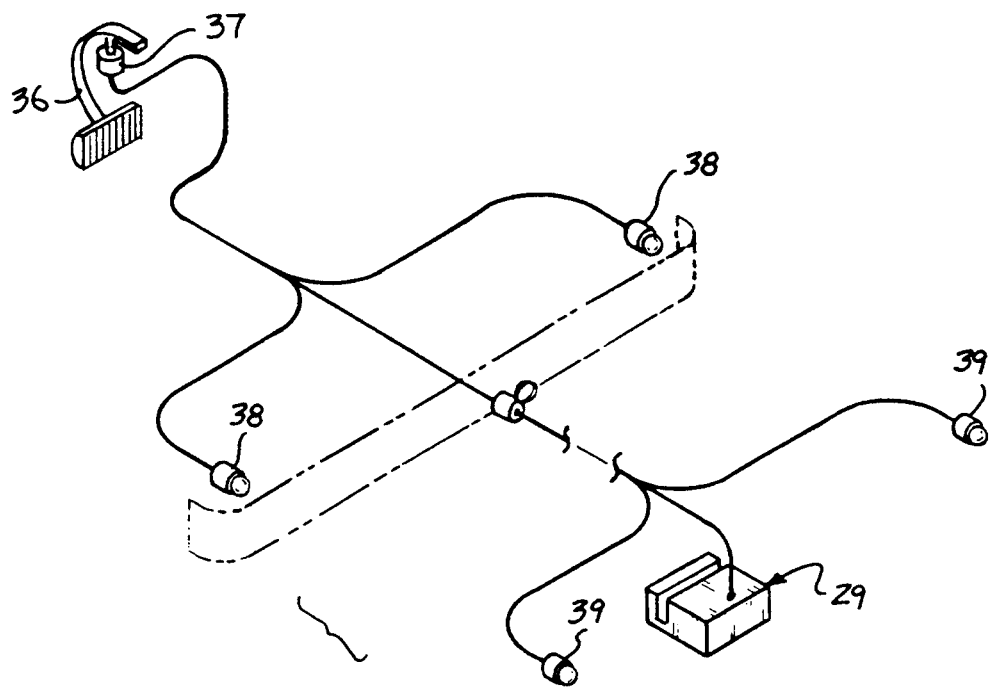
FIG. 5 is a diagrammatic illustration of the electrical communication of the caliper and towing vehicle brake system.

A caliper support bracket 20 is provided, as indicated in FIG. 4, to include respective first L-shaped bracket legs 21 and 22 that are coplanar and in a mirror image relationship to one another, with a first arcuate saddle 23 fixedly and orthogonally mounted to the first bracket leg 21 and a second arcuate saddle 24 fixedly and orthogonally mounted to the second bracket leg 22, with the first and second saddles 23 and 24 arranged in a parallel coextensive relationship, with a first clamp 25 directed into the first arcuate saddle 23 securing the first axle tube with a second clamp 26 directed into the second arcuate saddle 24 clamping the second axle tube, in a manner as indicated in FIG. 1.

A gap 27 is oriented between the first and second bracket legs, as indicated in the FIG. 4 for example, with a U-shaped channel bracket 28 fixedly and orthogonally mounted to the first and second bracket legs 21 and 22 at the gap 27, with the U-shaped channel bracket 28 extending below the first and second bracket legs 21 and 22 mounting a caliper housing 29 therewithin, in a manner as indicated in FIGS. 1 and 2 for example. A caliper housing forward flange 30 mounts a first brake pad 31 in a fixed orientation, wherein an electric solenoid 32 mounted within the caliper housing 29 having a solenoid piston 33 therewithin reciprocated within the electrical solenoid includes a second brake pad 34 in a spaced relationship relative to the first brake pad to receive the disc member 15 between the first and second brake pads 31 and 34. As illustrated, caliper fasteners 35 are directed through the caliper housing 29 and the U-shaped channel bracket 28 to secure the caliper housing within the channel bracket. With reference to the FIG. 5 indicates the cooperation of the solenoid relative to the electrical system of the towing vehicle such that the vehicular brake pedal lever 36 cooperative with a brake switch 37 arranged to illuminate the vehicular brake lights 38 in electrical communication with the trailer lights 39, whereupon actuation of the brake switch 37 effects simultaneous actuation of the vehicular brake lights 38, the trailer lights 39, and the solenoid 32 within the caliper housing 29 to direct the second brake pad 34 towards the first brake pad 31 and thereby grasp the disc member 15 therebetween.

Figure 6:
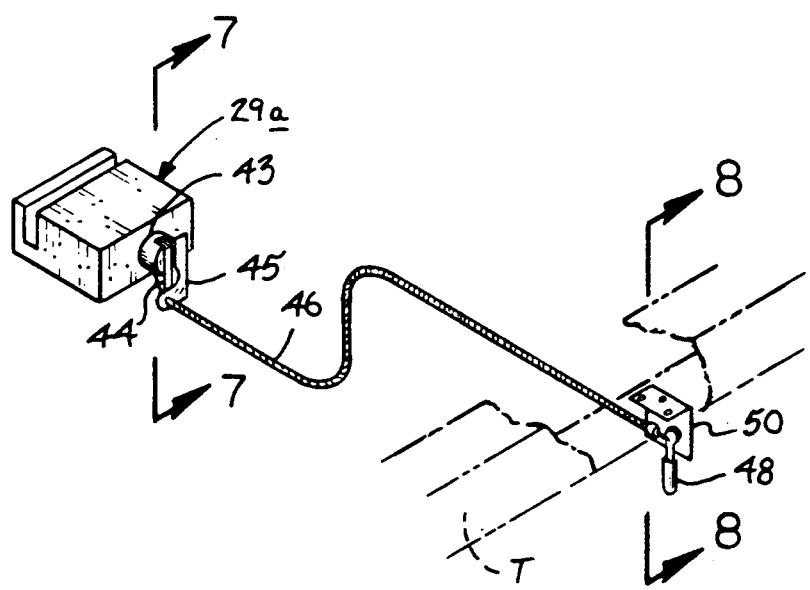
FIG. 6 is an isometric illustration of a modified caliper housing, including a mechanical emergency actuator structure.
Figure 7:
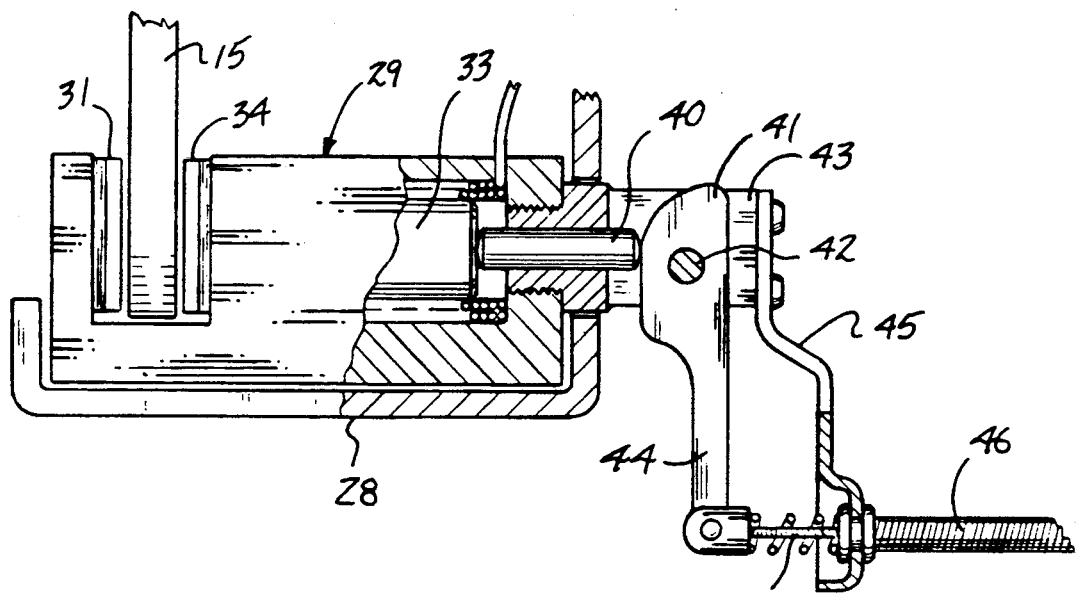
FIG. 7 is an orthographic view, taken along the lines 7—7 of FIG. 6 in the direction indicated by the arrows.
Figure 8:
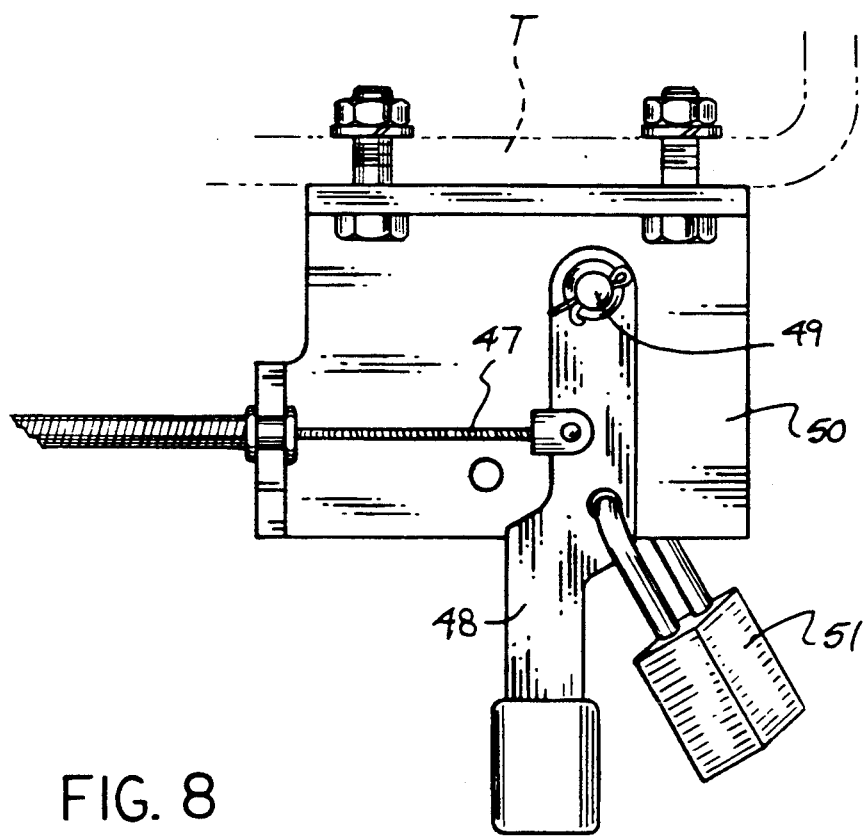
FIG. 8 is an orthographic view, taken along the lines 8—8 of FIG. 6 in the direction indicated by the arrows.

The FIG. 6 indicates the use of a manual emergency brake structure for use with a solenoid housing, such that an actuator rod 40 (see FIG. 7) directed through the rear wall of the caliper housing 29 is arranged in coaxially engagement with the solenoid piston 33. A cam plate 41 pivotally mounted about a cam plate axle 42 is provided, with the cam plate axle 42 mounted to a cam plate support flange 43 projecting rearwardly of the solenoid housing, wherein a cam plate lever 44 integral with the cam plate 41 is pivotal to direct the actuator rod 40 upon rotation of the cam plate 41 by the cam lever 44. Rotation of the cam plate lever 44 is effected by a cable sheath 46 mounted to a cable sheath support bracket mounted to the cam plate support flange 43, wherein the cable sheath includes an actuator cable 44 slidably directed therethrough, with a first end of the actuator cable 47 secured to the cam plate lever 44 and a second end of the actuator cable 47 mounted to an actuator lever 48, in a manner as illustrated in the FIGS. 6 and 8. The actuator lever 48 is pivotally mounted about an actuator lever axle 49, that in turn is secured to an actuator lever support flange 50 within the towing vehicle. To prevent unauthorized pivoting of the actuator lever 48 and actuation of the emergency braking system employing the actuator cable 47, the lock member 51 is directed through the actuator lever 48 and the associated latch lever support flange 50 to prevent unauthorized rotation of the actuator lever 48, in a manner as indicated. As illustrated in FIGS. 6 and 8, the towing vehicle "T" is oriented in a spaced orientation relative to the solenoid housing, and wherein it is understood that the actuator cable 47 as well as the cable sheath 46 are of a flexible construction to permit adjustable spacing of the towing vehicle relative to the towed vehicle having the differential housing 11 and the like, as indicated in FIG. 1.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An emergency brake apparatus for use with a differential housing, having a first axle tube spaced from a second axle tube, and a pinion gear companion flange extending from the differential housing, and wherein the apparatus comprises, a disc member having a disc hub, the disc hub including a hub floor, and the hub floor including a plurality of floor apertures, and a plurality of fasteners directed through the floor apertures mounting the disc hub to the companion flange, and a caliper support bracket having a first bracket leg spaced from a second bracket leg, the first bracket leg having a first arcuate saddle and a first clamp, wherein the first clamp is arranged to receive the first axle tube between the first clamp and the first saddle, and a second saddle fixedly secured to the second bracket leg, wherein the second saddle and the second clamp secure the second axle tube therebetween, with the first saddle and the second saddle arranged in a parallel coextensive relationship, and the first bracket leg and the second bracket leg each of a mirror image configuration relative to one another arranged in a coplanar orientation relative to one another, and a U-shaped channel bracket secured intermediate the first bracket leg and the second bracket leg simultaneously secured to the first bracket leg and the second bracket leg mounting a caliper housing, the caliper housing arranged to receive the disc member therebetween, and actuator means within the caliper housing to engage the disc member.

2. An apparatus as set forth in claim 1 wherein the actuator means includes a first brake pad arranged in a spaced relationship relative to a second brake pad, with the disc member arranged for rotation between the first pad and the second pad, and wherein the caliper housing includes a housing flange mounting the first brake pad, and an electric solenoid mounted within the caliper housing, with the electric solenoid arranged for engagement with the second brake pad to direct the second brake pad towards the first brake pad, and caliper fasteners directed through the caliper housing and the U-shaped channel bracket to secure the caliper housing to the U-shaped channel brackets.

3. An apparatus as set forth in claim 2 wherein the tow vehicle includes a brake switch, and wherein the solenoid is arranged in electrical communication with the brake switch to effect actuation simultaneously of the solenoid upon actuation of the brake switch to project the solenoid piston towards the first brake pad.

4. An apparatus as set forth in claim 3 wherein the caliper housing includes an actuator rod directed through the caliper housing into coaxial engagement with the solenoid piston, and a cam plate support flange mounted to the solenoid housing, the cam plate support flange including a cam plate axle, with the cam plate rotatably mounted about the cam plate axle and in engagement with the actuator rod, the cam plate having a cam plate lever extending from the cam plate, and a cable sheath support bracket fixedly secured to the cam plate support flange, with a cable sheath secured to the cable sheath support bracket, and an actuator cable directed slidably through the cable sheath, with the cable sheath having a cable sheath first end secured to the cam plate lever, and an actuator lever support flange, wherein the actuator lever support flange includes an actuator lever axle mounted to the actuator lever support flange, and an actuator lever pivotally mounted about the actuator lever axle, and wherein the actuator cable has an actuator second end secured to the actuator lever, wherein pivoting of the actuator lever effects pivoting of the cam plate lever to effect projection of the actuator rod into the solenoid housing and direct the solenoid piston to direct the second brake pad towards the first brake pad.

5. An apparatus as set forth in claim 4 including a lock member directed selectively through the actuator lever and the actuator lever support flange to secure the actuator lever relative to the actuator lever support flange.

* * * * *